J. O. BROCK.
AUXILIARY VALVE FOR INTERNAL COMBUSTION ENGINES.
APPLICATION FILED JULY 31, 1918.

1,344,614. Patented June 29, 1920.

Witnesses
Philip Ferrell
Francis L. Dowell

Inventor
J. O. Brock

By D. Swift & Co.
Attorneys

UNITED STATES PATENT OFFICE.

JOHN O. BROCK, OF WILMINGTON, NORTH CAROLINA.

AUXILIARY VALVE FOR INTERNAL-COMBUSTION ENGINES.

1,344,614.　　　　　Specification of Letters Patent.　　Patented June 29, 1920.

Application filed July 31, 1918. Serial No. 247,549.

*To all whom it may concern:*

Be it known that I, JOHN O. BROCK, a citizen of the United States, residing at Wilmington, in the county of New Hanover, State of North Carolina, have invented a new and useful Auxiliary Valve for Internal - Combustion Engines; and I do hereby declare the following to be a full, clear, and exact description of the invention, such as will enable others skilled in the art to which it appertains to make and use the same.

This invention relates to the art of valves and the like, and more especially to an improved valve designed for use in connection with internal combustion engines for admitting additional or auxiliary air into the intake manifold at a point above the carbureter.

One of the objects of the invention is to provide a device of this kind which is effective, in order to increase the efficiency of the engine with a given amount of fuel.

The invention further aims to provide means carried by the inner part of the valve casing, whereby the additional air may be drawn into the manifold in a whirling spray, so as to thoroughly co-mingle with and break up and mix with the initial air and fuel in said intake manifold, before the charge enters the cylinder, thereby increasing the efficiency for the motive power of the engine substantially fifty per cent.

The invention further aims to provide a device, which is automatically actuated on the suction stroke of the piston of the engine, so as to draw in sufficient auxiliary air to correspond with that of the charge.

The invention further aims to provide a device of this kind which can be used as a primer.

The invention further aims to provide a valve of this kind which can be easily and quickly adjusted, so as to increase or decrease the amount of air to be drawn into the manifold on the suction stroke of the piston, so as to provide the proper mixture.

In practical fields the details of construction may necessitate alterations falling within the scope of what is claimed.

The invention comprises further features and combination of parts as hereinafter set forth shown in the drawings and claimed.

In the drawings:—

Figure 3:
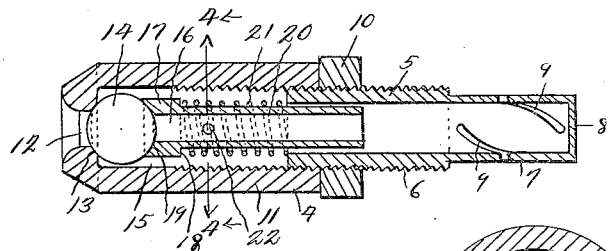
Fig. 3 is a longitudinal sectional view of the valve on an enlarged scale.
Figure 2:
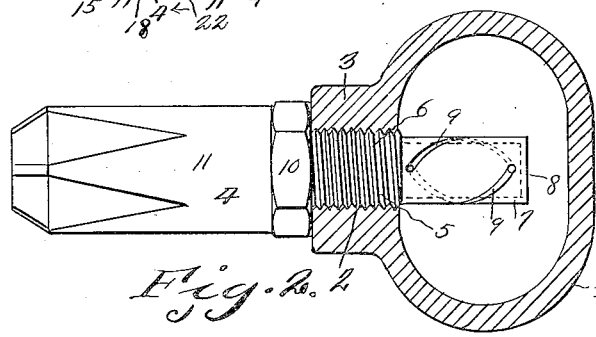
Fig. 2 is a view in cross section on line 2—2 of Fig. 1, showing the auxiliary intake valve in elevation.
Figure 1:
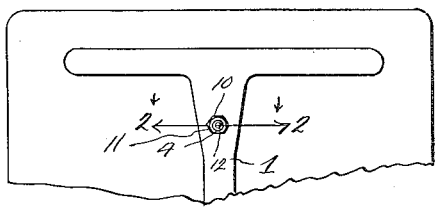
Figure 1 is a view in elevation of a portion of an engine cylinder and its intake manifold, showing the auxiliary air intake valve as applied to the manifold at a point above the carbureter which is not shown.
Figure 4:
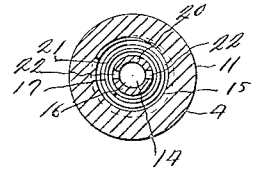
Fig. 4 is a cross sectional view on line 4—4 of Fig. 3.

Referring more especially to the drawings, 1 designates the intake manifold, the wall of which is provided with a threaded opening 2, which is formed through the boss 3, and 4 denotes the auxiliary intake valve as a whole. This valve comprises a tubular nipple section 5, which is exteriorly threaded as at 6 to adjustably engage the opening 2. The inner end portion of the nipple section has a reduced part 7, the inner end of which is closed as shown at 8. The wall of the reduced part 7 is provided with spiral opposed slots 9, the spiral arrangement of which causes the auxiliary intake of air to enter the manifold in a whirling spray, in order to thoroughly co-mingle or co-mix and break up the usual charge of combined air and fuel in the manifold before it enters the cylinder. Threaded on the tubular nipple section is a lock nut 10, which may be adjusted to contact with the boss 3 so as to lock the tubular nipple section in different adjusted positions in the opening 2. The valve casing proper 11 is threaded to the outer end of the tubular nipple section, to abut the outer face of the lock nut 10, thereby additionally locking the nipple section. The outer end of the valve casing has an opening 12 and an adjoining valve seat 13, with which the spherical or ball valve 14 coöperates. The opening 12 is of less diameter than the interior of the chamber 15 of the casing 11. The ball valve is also of less diameter than the chamber 15. A valve retaining member 16 (which is tubular) is provided. This valve retaining or holding member has an enlargement 17 at one end thereby affording a shoulder 18, and one end of the enlargement has a valve seat 19 for the ball valve. The ball valve is interposed between the two seats 13 and 19, and the restricted portion 20 of the tubular valve retaining or holding member is of less diameter in cross section than the interior diameter of the tubular nipple, and consequently fits loosely telescopically into the nipple, there being a coil spring 21 interposed between the outer end of the nipple and the shoulder 18, so as to hold the ball or spherical valve in contact with the seat 13. The valve retaining or holding member is provided with diametrically opposed openings 22, through which air is drawn when the valve 14 is out of contact with the seat 13. On the suction stroke of the piston of the engine the valve 14 becomes unseated and air is drawn through the opening 12 and about the valve, and passes between the retainer and the inner surface of the chamber of the valve casing 11, and between the reduced part of the retainer or holder and the inner wall of the nipple and also through the openings 22 into the intake manifold, through the slots 9, which, owing to their opposed spiral arrangement causes the air to enter the manifold in a whirling spray for the purpose as hereinbefore set forth. It is to be noted that the lock nut 10 and the valve casing 11 may be loosened, and the nipple threaded or adjusted outwardly, and after which the nut 10 and casing 11 may be screwed back into place, thereby further compressing the spring 21, hence increasing its tension on the ball valve. The increasing of the tension of the spring will tend to lessen the opening effect of the valve 14, thereby decreasing the amount of air to be drawn into the manifold. It is obvious that by decreasing the tension of the spring, the opening effect of the valve will be greater and will allow an increased supply of auxiliary air to pass into the manifold.

The invention having been set forth what is claimed as new and useful is:—

The combination with an intake manifold, of a tubular nipple threaded through the wall thereof adjustably, means on the nipple to retain it in its proper adjusted position, a valve casing threaded on the nipple exteriorly of the manifold, one end of the interior of the casing having a valve seat, a valve to coöperate therewith, a retainer loosely mounted in the nipple to engage the valve to hold it seated, one end of the retainer having a shoulder, and spring tensioning means between one end of the nipple and said shoulder adapted to be overcome on the suction stroke of the piston of the engine to unseat the valve, whereby an auxiliary supply of air may be drawn into the manifold, said tubular retainer having diametrically opposed openings, through which the air passes.

In testimony whereof I have signed my name to this specification in the presence of two subscribing witnesses.

JOHN O. BROCK.

Witnesses:
W. B. WOODBURY,
O. E. STUART.